United States Patent
Moon et al.

(10) Patent No.: US 12,544,697 B2
(45) Date of Patent: Feb. 10, 2026

(54) ANTIBACTERIAL COMPOSITION, FILTER USING THE SAME, AND HOME APPLIANCE COMPRISING FILTER

(71) Applicant: LG Electronics Inc., Seoul (KR)

(72) Inventors: Sun Young Moon, Seoul (KR); Hyungho Park, Seoul (KR); Dongryul Park, Seoul (KR)

(73) Assignee: LG Electronics Inc., Seoul (KR)

( * ) Notice: Subject to any disclaimer, the term of this patent is extended or adjusted under 35 U.S.C. 154(b) by 977 days.

(21) Appl. No.: 17/624,460

(22) PCT Filed: Jul. 1, 2020

(86) PCT No.: PCT/KR2020/008607
§ 371 (c)(1),
(2) Date: Jan. 3, 2022

(87) PCT Pub. No.: WO2021/002679
PCT Pub. Date: Jan. 7, 2021

(65) Prior Publication Data
US 2022/0355231 A1    Nov. 10, 2022

(30) Foreign Application Priority Data
Jul. 2, 2019    (KR) ........................ 10-2019-0079503

(51) Int. Cl.
*B01D 53/02*    (2006.01)
*A61L 9/01*    (2006.01)
(Continued)

(52) U.S. Cl.
CPC ............ *B01D 39/1623* (2013.01); *A61L 9/01* (2013.01); *A61L 9/16* (2013.01); *A61L 2209/14* (2013.01);
(Continued)

(58) Field of Classification Search
CPC .......... A61L 9/01; A61L 9/16; A61L 2209/14; A61L 2/232; A61L 2/238; F24F 8/24; F24F 8/108
(Continued)

(56) References Cited

U.S. PATENT DOCUMENTS 7,931,734 B2 * 4/2011 Moosmuller ............. B03C 5/00
    209/127.1
7,942,957 B2 * 5/2011 Lee ........................ A01N 43/80
    427/430.1
(Continued)

FOREIGN PATENT DOCUMENTS

CN    1604941 A    4/2005
CN    102225281 A    10/2011
(Continued)

OTHER PUBLICATIONS

Extended European Search Report in European Appln. No. 20834118.0, mailed on Jul. 21, 2023, 9 pages.
Office Action in Chinese Appln. No. 202080048993.3, mailed on Apr. 13, 2023, 29 pages (with English translation).

*Primary Examiner* — Christopher P Jones
(74) *Attorney, Agent, or Firm* — Fish & Richardson P.C.

(57) ABSTRACT

The present disclosure relates to an antibacterial composition, a filter using the same, and a home appliance such as an air conditioner comprising the filter. More specifically, the antibacterial composition according to the present disclosure comprises a polymer resin, and an antibacterial additive composed of an antibacterial metal and an antibacterial metal oxide, and thus a filter manufactured therefrom has excellent antibacterial activity and also maintains antibacterial performance even if washed.

11 Claims, 2 Drawing Sheets

(51) Int. Cl.
*A61L 9/16* (2006.01)
*B01D 39/16* (2006.01)

(52) U.S. Cl.
CPC ............... *B01D 2239/0442* (2013.01); *B01D 2239/065* (2013.01)

(58) Field of Classification Search
USPC ...... 95/31, 69, 73, 78, 79; 96/57, 74, 75, 77
See application file for complete search history.

(56) References Cited

U.S. PATENT DOCUMENTS

| | | |
|---|---|---|
| 2004/0225049 A1 | 11/2004 | Komuro |
| 2004/0259973 A1 | 12/2004 | Sakuma et al. |

FOREIGN PATENT DOCUMENTS

| | | |
|---|---|---|
| CN | 102302875 A | 1/2012 |
| CN | 204709980 U | 10/2015 |
| CN | 107675290 A | 2/2018 |
| CN | 109468690 A | 3/2019 |
| JP | H11263703 A | 9/1999 |
| JP | 2000312809 | 11/2000 |
| JP | 2007191801 | 8/2007 |
| JP | 2012095699 A | 5/2012 |
| KR | 20040107192 | 12/2004 |
| KR | 20060022443 | 3/2006 |
| KR | 20140009892 | 1/2014 |
| KR | 101775158 | 9/2017 |

\* cited by examiner

ANTIBACTERIAL COMPOSITION, FILTER USING THE SAME, AND HOME APPLIANCE COMPRISING FILTER

CROSS-REFERENCE TO RELATED APPLICATIONS

This application is a National Stage application under 35 U.S.C. § 371 of International Application No. PCT/KR2020/008607, filed on Jul. 1, 2020, which claims the benefit of Korean Patent Application No. 10-2019-0079503, filed on Jul. 2, 2019. The disclosures of the prior applications are incorporated by reference in their entirety.

TECHNICAL FIELD

Disclosed herein are an antibacterial composition, a filter using the same, and a home appliance such as an air conditioner and the like with the filter.

BACKGROUND ART

At a time when fine dust greatly affects our daily lives, home appliances such as an air purifier or an air conditioner have been widely used. Additionally, in dry weather, home appliances such as a humidifier are usually used.

Among home appliances, an air conditioner or a humidifier is provided with an air filter. The filter has an antibacterial function for removing germs that can be included in dust or pet fur and the like.

In particular, the air conditioner is provided with a pre-filter that is used to filter hair, pet fur, dust and the like.

Among objects to be filtered by the pre-filter, pet fur can serve as a carrier that spreads harmful viruses. In this context, the pre-filter needs to provide antibacterial performance.

An existing pre-filter has an antibacterial coating. However, the coating can be removed while the pre-filter is washed.

Thus, there is a growing need for a novel filter that ensures excellent antibacterial performance and maintains antibacterial performance even if washed.

DESCRIPTION OF INVENTION

Technical Problems

One objective of the present disclosure is to provide an antibacterial composition for a filter, which is a material for a novel filter that ensures excellent antibacterial performance and maintains antibacterial performance even if washed.

Another objective of the present disclosure is to provide a pre-filter for an air conditioner, which is formed using the antibacterial composition.

Yet another objective of the present disclosure is to provide a home appliance (an air conditioner, a humidifier and the like) to which the filters are applied.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

To achieve the above objectives, an antibacterial composition according to the present disclosure is characterized in including a polymer resin and an antibacterial additive.

Specifically, the antibacterial composition includes a polymer resin, and an antibacterial additive comprised of antibacterial metal and antibacterial metal oxide.

According to the disclosure, the components and content of the additive are controlled to maximize an antibacterial effect as well as a filtering effect.

Further, a pre-filter according to the present disclosure has a mesh structure that is formed as a result of melt spinning of the composition including a polymer resin and an antibacterial additive, to provide a filter for an air conditioner, which ensures maximized antibacterial performance.

Advantageous Effects

According to the present disclosure, since a filter is manufactured using a composition including a polymer resin and an antibacterial additive, the filter ensures excellent antibacterial activity, and maintains antibacterial performance even if washed.

Specific effects are described along with the above-described effects in the section of Detailed Description.

DETAILED DESCRIPTION OF EXEMPLARY EMBODIMENT

Figure 1:
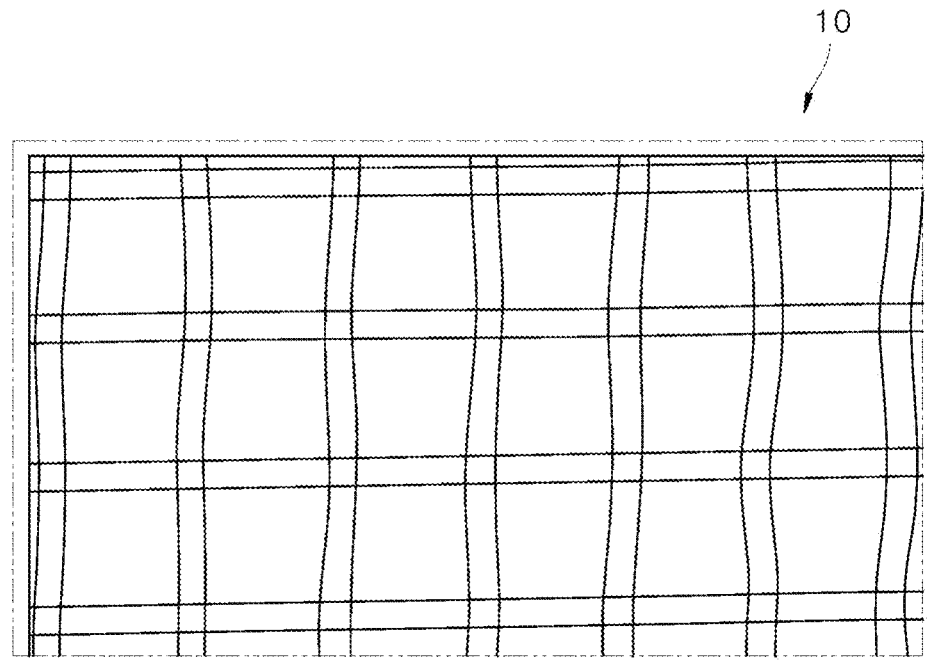
FIG. 1 is a view showing a portion of a pre-filter for an air conditioner according to the present disclosure.

The above-described aspects, features and advantages are specifically described hereunder with reference to the accompanying drawings such that one having ordinary skill in the art to which the present disclosure pertains can easily implement the technical spirit of the disclosure. In the disclosure, detailed description of known technologies in relation to the disclosure is omitted if it is deemed to make the gist of the disclosure unnecessarily vague. Below, preferred embodiments according to the disclosure are specifically described with reference to the accompanying drawings. In the drawings, identical reference numerals indicate identical or similar components.

Hereafter, an antibacterial composition according to the disclosure, and a filter and a home appliance using the same are described.

<Antibacterial Composition for Forming Filter>

An antibacterial composition for forming a filter according to the disclosure may include a polymer resin; and an antibacterial additive comprised of antibacterial metal and antibacterial metal oxide.

The composition according to the disclosure includes a polymer resin. The polymer resin is a basic material for a filter.

The sort of the polymer resin is not limited. The polymer resin is used for a polymer-based filter, and any material having proper rigidity may be used for a polymer-based filter. The polymer resin may include polyethyleneterephthalate (PET), for example.

Additionally, the composition according to the disclosure includes an antibacterial additive. The antibacterial additive is comprised of antibacterial metal and antibacterial metal oxide.

The antibacterial metal denotes metal particles providing antibacterial performance. Any metal particle providing antibacterial performance may be used as the metal particle in an unlimited way. The metal particles include silver (Ag), gold (Au), platinum (Pt), and the like, and may include silver (Ag), for example.

The antibacterial metal oxide denotes metal oxide providing antibacterial performance. Any metal oxide providing antibacterial performance may be used as the metal oxide in an unlimited way. Zinc oxide (ZnO), titanium dioxide ($TiO_2$), and the like may be used as the metal oxide, and the metal oxide may include silver (Ag), for example.

Additionally, a ratio of the metal to the metal oxide may be approximately 3:7, for example.

For example, 0.1-2 parts by weight of the antibacterial additive may be included with respect to 100 parts by weight of the polymer resin. When greater than 2 parts by weight of the antibacterial additive is included in the composition, strength of a filter may decrease. When less than 0.1 parts by weight of the antibacterial additive is included in the composition, required bacterial performance may not be ensured.

<Pre-Filter for Air Conditioner>

Hereafter, a pre-filter for an air conditioner according to the disclosure is described.

Referring to FIG. 1, the pre-filter 10 for an air conditioner according to the disclosure may be formed as a result of melt spinning of the composition, and have a mesh structure.

A size of the mash structure of the filter 10 may change properly when necessary.

The filter 10 according to the disclosure is formed as a result of melt spinning of the composition mixed with the polymer resin and the antibacterial additive. Accordingly, components of the filter 10, providing antibacterial performance, are not lost, even if the filter 10 is washed.

Additionally, preferred examples of the polymer resin and the additive are described above.

Further, well-known methods may be applied to a melt spinning method of the composition.

<Filter for Air Conditioner and Air Conditioner Including the Same>

Hereafter, a filter for an air conditioner, and an air conditioner including the same, according to the disclosure are described.

Figure 2:
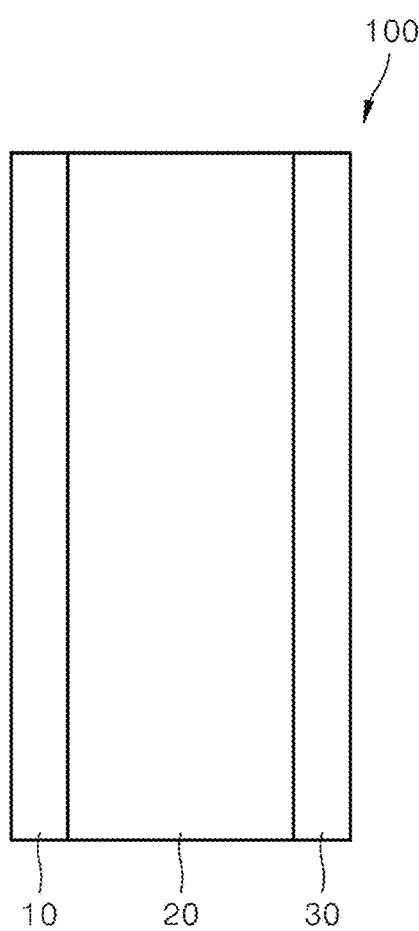
FIG. 2 is a cross-sectional view schematically showing a structure of a cross section of a filter of the air conditioner according to the present disclosure.

Referring to FIG. 2, the filter 100 for an air conditioner according to the disclosure has a stack structure in which a pre-filter 10 layer; a high efficiency particulate air (HEPA) filter 20 layer; and a deodorization filter 30 layer are consecutively stacked from an outermost edge of the filter 100.

As shown in FIG. 2, the filter 100 for an air conditioner according to the disclosure has a stack structure in which at least three layers are stacked.

The pre-filter 10 is disposed at the outermost edge of the filter 100. As described above, the pre-filter 10 is a component for filtering relatively large particles. The pre-filter 10 filters hair or pet fur, and the like. Additionally, the pre-filter 10 according to the disclosure provides antibacterial performance, as described above. The pre-filter 10 may be attached to the filter 100 detachably, and may be detached to be washed.

The HEPA filter 20 is disposed in the middle of the three-layered stack structure. In the disclosure, well-known filters may be applied to the HEPA filter 20.

The deodorization filter 30 is disposed at an innermost side of the filter 100. Likewise, well-known deodorization filters may be applied to the deodorization filter 30.

Figure 3:
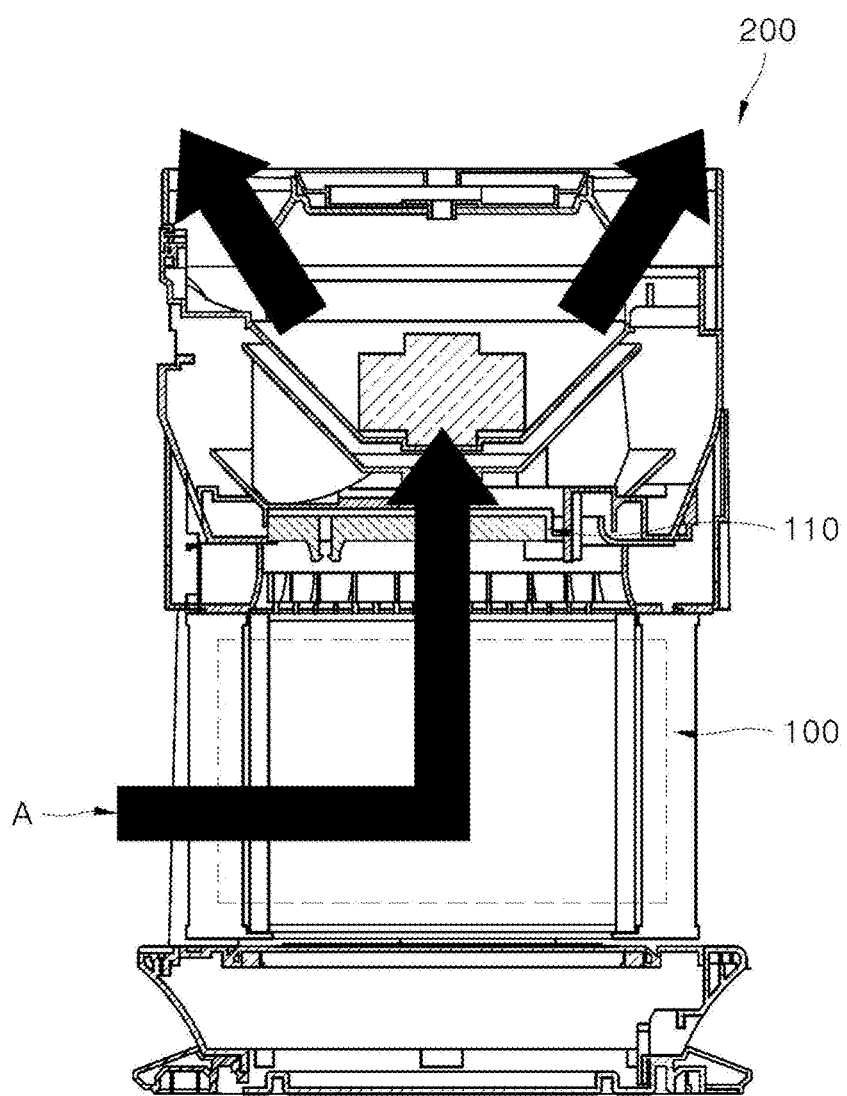
FIG. 3 is a cross-sectional view schematically showing an inner cross section of an air conditioner in one embodiment.

The air conditioner according to the disclosure includes the filter 100. FIG. 3 shows an air conditioner 200 in one embodiment. Referring to FIG. 3, the air conditioner 200 includes a filter 100 and a pan 110, and air moves in the air conditioner along flow A. In this case, various types of contaminants in the air are filtered while the air passes through the stack structure of the filter 100.

Certainly, a structure of the air conditioner according to the disclosure is not limited to the structure of the air conditioner 200 in FIG. 3.

EMBODIMENT

Embodiment—Manufacturing of Pre-Filter for Air Conditioner

Polyethylene terephthalate resin was put into an extrude, 0.5 part by weight of silver (Ag) particles and 1 part by weight of zinc oxide (ZnO) were put into the extrude with respect to 100 parts by weight of the resin, and then the components were melted and mixed to manufacture a spinning solution. Then the sinning solution was melt-spun at a spinning speed of 4000 m/min through a spinneret, to manufacture a mesh-type pre-filter.

EXPERIMENTAL EXAMPLE

A test for antibacterial performance of embodiments 1 and 2 was performed.

A degree of antibacterial activity of a pre-filter in embodiment 1 and a filter for a humidifier in embodiment 2 was measured based on a test method of KS K 0693:2011. *Staphylococcus aureus* (ATCC 6538) was used as a strain. Table 1 hereunder shows results of the measurement.

TABLE 1

| | Initial-stage strain | After 18 hours | Bactericidal reduction ratio (%) | Bacteriostatic reduction ratio (%) |
|---|---|---|---|---|
| Embodiment | $3.1 \times 10^4$ | $4.1 \times 10^3$ | 87% | >99.9 |

Bactericidal reduction ratio=(Ma−Mc)/Ma×100
Bacteriostatic reduction ratio=(Mb−Mc)/Mb×100
Ma: Number of viable bacteria right after injection of control test piece
Mb: Number of viable bacteria after 18 hours of culture of control test piece
Mc: Number of viable bacteria after 18 hours of culture of test piece As shown in table 1, the filter according to the disclosure provides excellent antibacterial performance. Additionally, for the filter according to the disclosure, an antibacterial component is included in the resin, instead of using a coating method, to provide antibacterial performance. Thus, the antibacterial performance does not deteriorate even after a wash.

The embodiments are described above with reference to a number of illustrative embodiments thereof. However, the present disclosure is not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

DESCRIPTION OF REFERENCE NUMERALS

10: Pre-filter
20: HEPA filter
30: Deodorization filter
100: Filter for air conditioner
110: PAN
200: Air conditioner
A: Air flow

The invention claimed is:

1. An antibacterial composition for a filter, consisting of:
a polymer resin comprising polyethylene terephthalate (PET); and
an antibacterial additive consisting of silver (Ag) and zinc oxide (ZnO).

2. The antibacterial composition of claim 1, wherein a weight of the antibacterial additive is 0.1% to 2% of a weight of the polymer resin.

3. The antibacterial composition of claim 1, wherein a weight of Ag in the antibacterial additive is 0.5% of the weight of the polymer resin, and
wherein a weight of ZnO in the antibacterial additive is 1% of the weight of the polymer resin.

4. A pre-filter for an air conditioner, the pre-filter having a mesh structure and being made by melt-spinning of an antibacterial composition, the antibacterial composition consisting of:
a polymer resin comprising polyethylene terephthalate (PET); and
an antibacterial additive consisting of silver (Ag) and zinc oxide (ZnO).

5. The pre-filter of claim 4, wherein a weight of the antibacterial additive is 0.1% to 2% of a weight of the polymer resin.

6. The pre-filter of claim 4, wherein a weight of Ag in the antibacterial additive is 0.5% of the weight of the polymer resin, and
wherein a weight of ZnO in the antibacterial additive is 1% of the weight of the polymer resin.

7. A filter for an air conditioner, comprising:
a pre-filter layer disposed at an outermost side of the filter;
a deodorization filter layer disposed at an innermost side of the filter; and
a high efficiency particulate air (HEPA) filter layer disposed between the pre-filter layer and the deodorization filter layer,
wherein the pre-filter layer has a mesh structure and is made by melt-spinning of an antibacterial composition, the antibacterial composition consisting of:
a polymer resin comprising polyethylene terephthalate (PET), and
an antibacterial additive consisting of silver (Ag) and zinc oxide (ZnO).

8. The filter of claim 7, wherein the filter has a stack structure including the pre-filter layer, the HEPA filter layer, and the deodorization filter layer that are arranged along a stack direction.

9. The filter of claim 8, wherein a thickness of the HEPA filter layer in the stack direction is greater than a thickness of each of the pre-filter layer and the deodorization filter layer in the stack direction.

10. The filter of claim 8, wherein the HEPA filter layer has a first side that is in contact with the pre-filter layer in the stack direction and a second side that is in contact with the deodorization filter layer in the stack direction.

11. The air conditioner comprising the filter of claim 7, wherein the air conditioner is configured to flow air in a direction from the pre-filter layer to the deodorization filter layer through the HEPA filter.

* * * * *